United States Patent Office 3,522,523

Patented Aug. 4, 1970

3,522,523

METHOD AND APPARATUS FOR TESTING THIN MAGNETIC FILM CARRIED ON A WIRE SUBSTRATE

Geoffrey N. Portas, Ilford, England, assignor to The Plessey Company Limited, Ilford, England, a British company Filed June 3, 1968, Ser. No. 734,133
Claims priority, application Great Britain, June 9, 1967, 26,757/67
Int. Cl. G01r *33/18*
U.S. Cl. 324—34 3 Claims

ABSTRACT OF THE DISCLOSURE

A method of testing at regular intervals a logical device comprising an elongated substrate having a thin magnetic film deposited thereon, the film having a preferred direction of magnetisation, the method comprising applying a stress to the film and sensing displacement of the preferred direction of magnetisation.

Figure 1:
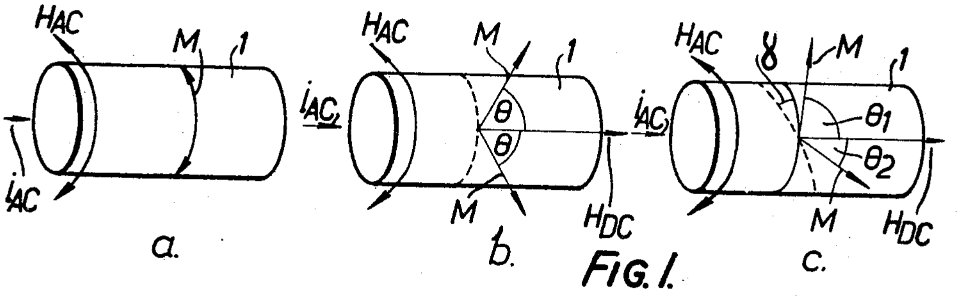

This invention relates to methods and apparatus for testing logical devices. More particularly the invention relates to methods and apparatus for testing thin magnetic films deposited on elongated substrates.

It has been proposed to employ in a magnetic data storage device an electrically conductive wire on which is deposited a thin cylindrical film of ferromagnetic material. In one method of depositing the film a suitably cleaned and prepared conductive wire is continuously fed through a plating bath where said electrodeposition is carried out employing said wire as one electrode in the electrodeposition process. Moreover, in order to impart uniaxial anisotropy to the deposited thin magnetic film an A.C. aligning magnetic field is employed during the deposition. In one example where it is required to impart an easy axis to the thin magnetic film in its circumferential direction the A.C. aligning field is set up by the application of an alternating current to the wire.

In one embodiment the thin magnetic film is of a nickel-iron alloy and it is desired that the relative proportions of nickel and iron in the alloy should be such that the alloy has a minimum stress sensitivity, or magnetostriction, since such a property reduces problems in handling such logical devices especially when these are being incorporated in memory planes and may be subjected to stresses.

The magnetostriction coefficient of a thin magnetic film is indicative of the sensitivity of the magnetisation thereof to stress. If the magnetostriction coefficient is zero, the stress sensitivity is zero; if the magnetostriction coefficient has a positive value the magnetisation of the element tends to align parallel to the axis of the applied stress; if the magnetostriction coefficient has a negative value the megnetisation of the element tends to align perpendicular to the axis of the applied stress. In the case of thin films of a nickel-iron alloy it has been found that if the percentage of nickel in the alloy is increased from below 80% to above 80% then the magnetostriction coefficient changes rapidly from a negative value to a positive value. In practice the conditions of the electrodeposition process in which the thin magnetic film is formed are arranged to be such that the composition of the deposited alloy is substantially 80% nickel and 20% iron. However, due to the rapid change in the magnetostriction coefficient in the vicinity of this composition it is desirable that the megnetostriction coefficient of a continuously formed thin magnetic film on an elongated substrate be sensed from time to time with a view to ensuring that said coefficient does not have an undesirably high magnitude at any part of the length of the thin magnetic film.

According to one feature of the invention there is provided a method of testing a logical device comprising an elongated substrate having a thin magnetic film deposited on said substrate, said film having a preferred direction of magnetisation, the method comprising applying a stress to said film and sensing displacement of said preferred direction of magnetisation.

According to another feature of the invention there is provided apparatus for testing a logical device comprising an elongated substrate having a thin magnetic film having a preferred direction of magnetisation deposited on said substrate, the apparatus comprising means for applying a stress to said magnetic film and means for sensing displacement of said preferred direction of magnetisation.

If a stress is applied to a thin magnetic film having a magnetostriction coefficient other than zero, then the preferred direction of magnetisation becomes displaced, the sense of the displacement being dependent upon the sign of the magnetostriction coefficient, and the extent of the displacement being dependent upon the magnitude of said coefficient.

In a preferred embodiment, the elongated substrate is an electrically conductive wire and the thin magnetic film is a cylindrical film deposited on said wire. Moreover the preferred direction of magnetisation, or easy axis, of the thin magnetic film is arranged to be circumferential of said film and is set up by the application to the wire substrate of a suitable alternating current during deposition of the thin magnetic film, which current sets up a circumferential A.C. magnetic field. In one method of carrying the invention into effect such a wire carrying a thin magnetic film and still subject to said A.C. magnetic field is fed through a small D.C. magnetic field applied at right angles to the A.C. magnetic field, i.e., said D.C. magnetic field is applied in the axial direction of the wire. This causes the resultant magnetisation of the cylindrical magnetic film to be symmetrical about the axis of the wire. A stress is then applied to the wire carrying the magnetic film, in the form of a small twist, and if the film has a finite magnetostriction coefficient the preferred direction of magnetisation will skew from the circumferential direction of the film in one sense or the other depending upon the sign of the magnetostriction coefficient. The effect of this is to render the aforesaid resultant magnetisation of the film asymmetrical about the axis of the wire. A pick-up coil may be provided around the wire for sensing the resultant magnetisation, and suitable means employed whereby an indication of asymmetry of said magnetisation and so of any displacement of the preferred direction of magnetisation in response to said twisting can be derived.

Figure 3:
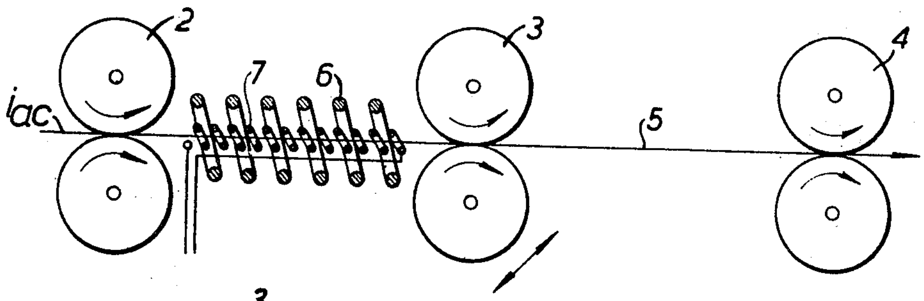
Figure 5:
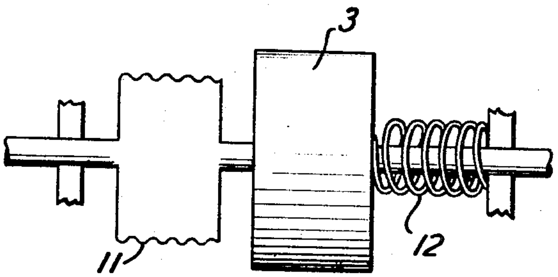
Figure 4:
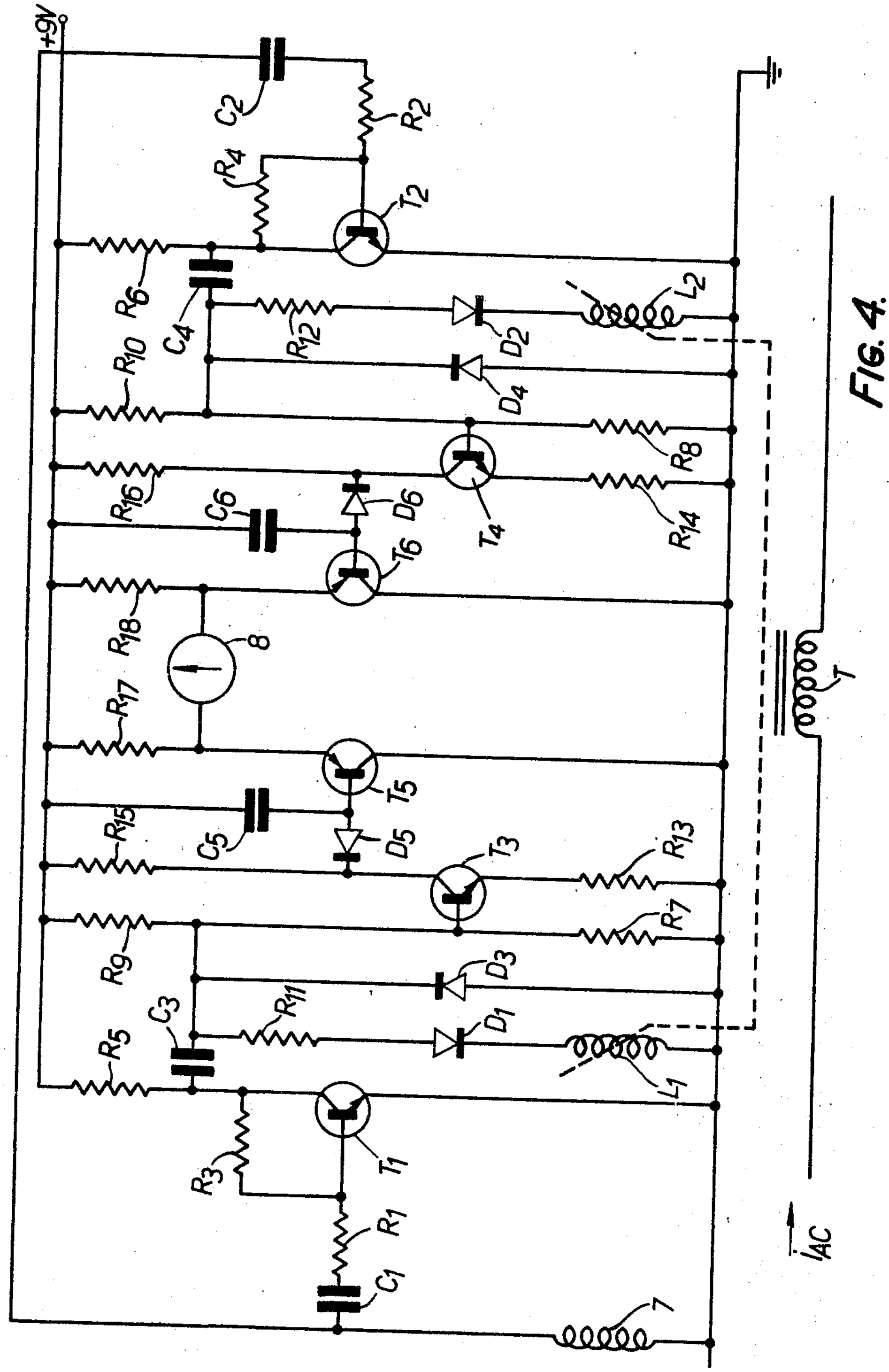

In order that the invention may be clearly understood and readily carried into effect it will now be more fully described with reference to the accompanying drawings, in which:

FIGS. 1*a*, 1*b*, 1*c* and 2 are illustrative of the theory of the invention,

FIG. 3 shows diagrammatically apparatus in accordance with one embodiment of the invention, FIG. 4 is a circuit diagram for utilising a sensed signal from the apparatus of FIG. 3, FIG. 5 is a detail view of the roller displacing means.

The invention will be described with reference to the drawings as applied to a logical device in the form of a conductive wire having deposited thereon a cylindrical thin film of a suitable ferromagnetic material, which may for example be a nickel-iron alloy. The logical device of this embodiment is manufactured and tested in a substantially continuous process by feeding a conductive wire through a series of processes in one of which the thin film is formed on the wire by electrodeposition, and in another of which said thin film is tested for magnetostriction by a method and apparatus according to one embodiment of the invention.

In FIG. 1*a* a length of the cylindrical thin film is shown on an enlarged scale and is indicated by reference numeral 1. An alternating current $i_{AC}$ is applied along the wire substrate, and this may conveniently be the alternating current employed during the deposition process to set up a preferred direction of magnetisation of the cylindrical film in a circumferential direction. Thus the alternating current $i_{AC}$ sets up an A.C. magnetic field indicated in FIG. 1 by the reference $H_{AC}$. The magnetisation M of the cylindrical film due to the A.C. magnetic field $H_{AC}$ in the absence of stress is shown in FIG. 1*a* and is circumferential of the film 1. It will be appreciated that the magnetisation M alternates with the A.C. magnetic field $H_{AC}$. FIG. 1*b* shows the effect on the magnetisation M of the thin film 1 of the application of a small D.C. magnetic field $H_{DC}$ in the axial direction of the film 1 in addition to the A.C. magnetic field $H_{AC}$. The representation in FIG. 1*b* assumes that no stress is applied to the film 1 so that the preferred direction of magnetisation remains parallel to the A.C. magnetic field $H_{AC}$ as indicated by the dotted line. The effect of the small D.C. magnetic field is to cause the magnetisation M to become rotated towards the axis of the film 1, said magnetisation M being symmetrical about the axis at an angle $\theta$ thereto. If now a small twist is applied to the wire carrying the cylindrical thin film 1, and said film has a finite magnetostriction coefficient then the effect of this twist is, as shown in FIG. 1*c*, to cause the preferred direction of magnetisation to skew away from the circumferential direction of the cylindrical film 1 at an angle $\gamma$ thereto, the sense of the displacement of the preferred direction of magnetisation being dependent upon whether said magnetostriction coefficient is positive or negative and the magnitude of the angle $\gamma$ being dependent upon the magnitude of said magnetostriction coefficient. The effect of the displacement of the preferred direction of magnetisation is to cause a corresponding displacement of the resultant magnetisation M which is no longer symmetrical about the axis of the film 1 being inclined at different angles $\theta_1$ and $\theta_2$ to said axis. It will be appreciated that if the magnetostriction coefficient of the film 1 is zero the resultant magnetisation of the film will be symmetrical irrespective of whether a stress is applied to the film 1. Thus asymmetry of the resultant magnetisation M is indicative of the magnetostriction coefficient of the film 1.

In accordance with one embodiment of the invention the resultant magnetisation of a thin magnetic film is continuously sensed by a pickup coil around the wire carrying said film, the wire being fed through the pickup coil, and moreover said wire is periodically twisted to enable the magnetostriction coefficient of the film to be checked. Apparatus for this process is shown diagrammatically in FIG. 3 in which a wire substrate having a thin cylindrical magnetic film formed thereon is fed along a path by three pairs of rollers 2, 3 and 4. The pairs of rollers 2 and 4 are fixed in position but one of the pair of rollers 3 is laterally movable so as to be capable of imparting a twist to the coated wire, which wire is indicated by reference 5. An alternating current $i_{AC}$ is applied to the wire 5 and sets up the aforementioned alternating magnetic field $H_{AC}$. Conveniently the current $i_{AC}$ can be the alternating current which is employed during the deposition process to set up a circumferential preferred direction of magnetisation in the cylindrical magnetic film. Between the pairs of rollers 2 and 3 there is disposed a field coil 6 arranged to surround the coated wire 5 as said wire 5 is fed along in the direction indicated by the rollers 2, 3 and 4. A direct current is applied to the field coil 6 to set up a small D.C. magnetic field $H_{DC}$ in the axial direction of the coated wire 5. Also between said pairs of rollers 2 and 3 there is disposed a pickup coil 7 arranged to surround the coated wire 5, for sensing the resultant magnetisation of the thin cylindrical magnetic film in response to the fields $H_{AC}$ and $H_{DC}$.

In operation of the apparatus shown in FIG. 3 the wire 5 is fed continuously by the pairs of rollers 2, 3 and 4 and the magnetic fields $H_{AC}$ and $H_{DC}$ are set up to give a resultant magnetisation M of the cylindrical magnetic film which is sensed by the pickup coil 7. Periodically the movable roller of the pair of rollers 3 is moved laterally to impart a twist to the length of coated wire 5 between the pairs of rollers 2 and 4. The rollers 2 and 4 ensure that the twist applied to the coated wire 5 is always applied to the same length of wire, and also ensure that said twist is not transmitted to other apparatus in the manufacturing process. Preferably, the movable roller 3 is moved by pneumatic bellows 11 associated with a return spring 12 for returning said roller to its original position when the bellows are deenergised. By way of example the movable roller may be moved in the lateral direction to twist the wire 5 by a distance of about five thousandths of an inch, and is maintained in its moved position for about one second. Moreover the movable roller may be arranged to be moved every 15 seconds.

Figure 2:
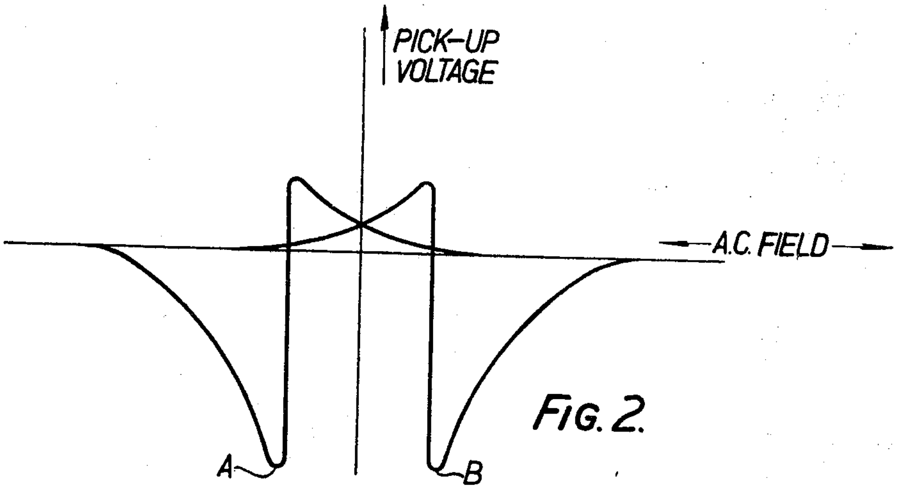

The voltage induced in the pickup coil 7 in the absence of an applied twist to the wire 5 is shown diagrammatically in FIG. 2. As can be seen in this figure the induced voltage is symmetrical with respect to the axial direction of the wire 5 which corresponds to the vertical axis. The induced voltage has two voltage peaks A and B as shown in FIG. 2 which are equal in height when said induced voltage, and correspondingly the resultant magnetisation M, is symmetrical. Thus whilst the wire 5 is not twisted the peaks A and B will be of equal height, and every 15 seconds, in this embodiment, the peaks A and B may have different heights depending upon the magnetostriction coefficient of the cylindrical magnetic film.

The output from the pickup coil 7 is applied to a gated differential amplifier which is employed to sense differences between the heights of the peaks A and B. A circuit diagram of a suitable gated differential amplifier for this purpose is shown in FIG. 4. In this circuit the pickup coil 7 is arranged to feed the bases of two transistor amplifiers $T_1$ and $T_2$ via series capacitors $C_1$ and $C_2$ respectively, and resistors $R_1$ and $R_2$ respectively. The base-collector circuit of each of the transistors $T_1$ and $T_2$ comprises further resistors $R_3$ and $R_4$ respectively, and said collectors are each coupled to a positive voltage supply of 9 volts via a biasing resistor $R_5$ and $R_6$ respectively. The emitters of both transistors $T_1$ and $T_2$ are grounded, and their collectors are each coupled via capacitors $C_3$ and $C_4$ respectively, to the base of transistors $T_3$ and $T_4$ respectively. The bases of the transistors $T_3$ and $T_4$ are also coupled to ground via resistors $R_7$ and $R_8$ respectively, and to the 9-volt positive supply via resistors $R_9$ and $R_{10}$ respectively. Moreover connected in parallel with each of the resistors $R_7$ and $R_8$ are two paths, one of which is a unidirectional path in one direction and the other of which is a unidirectional path in the opposite direction. In each case the first unidirectional path comprises in series a resistor $R_{11}$ and $R_{12}$ respectively, a diode $D_1$ and $D_2$ respectively, and an inductance $L_1$ and $L_2$ respectively. Also in each case the second unidirectional path comprises a diode $D_3$ and $D_4$ respectively. The diodes $D_1$ and $D_2$ are connected with opposite polarity to the diodes $D_3$ and $D_4$ as shown.

The emitters of the transistors $T_3$ and $T_4$ are grounded via resistors $R_{13}$ and $R_{14}$ respectively, and their collectors are coupled to the 9-volt supply via resistors $R_{15}$ and $R_{16}$ respectively. Said collectors of the transistors $T_3$ and $T_4$ are also connected via respective diodes $D_5$ and $D_6$ to the bases of two further transistors $T_5$ and $T_6$ respectively. The connections between the diodes $D_5$ and $D_6$ and the respective transistors $T_5$ and $T_6$ are also coupled to the 9-volt supply via storage capacitors $C_5$ and $C_6$ respectively. The emitters of transistors $T_5$ and $T_6$ are coupled to the 9-volt supply via resistors $R_{17}$ and $R_{18}$ respectively and their collectors are grounded. The emitters of the transistors $T_5$ and $T_6$ are also coupled to a meter 8.

A gating coil T is provided as a primary coil of a transformer, of which the inductances $L_1$ and $L_2$ are secondaries and are connected in opposite phases, and the gating coil T is connected in series with the plated wire 5 and so has the current $i_{AC}$ applied to it.

In operation of the gated differential amplifier shown in FIG. 4 the signal picked up by the pickup coil 7 is applied simultaneously to the bases of transistors $T_1$ and $T_2$ where it is amplified. At the same time the current $i_{AC}$ is passed through the gating coil T and hence to the inductances $L_1$ and $L_2$. In the positive half cycle of the AC, current flows through the diodes $D_1$ and $D_3$ thus holding the base of the transistor $T_3$ below ground potential and so preventing the amplified signal from transistor $T_1$ from being transmitted to the diode $D_5$ and capacitor $C_5$ which together constitute a diode pump integrator. Also during said positive half cycle, the diode $D_2$ prevents current from the inductance $L_2$ from flowing so that the base of the transistor $T_4$ is just above ground potential. The amplified signal from transistor $T_2$ is accordingly further amplified by transistor $T_4$ and integrated by a diode pump integrator comprising the diode $D_6$ and capacitor $C_6$. During the negative half cycle of the AC the reverse occurs, the signal applied to the transistor $T_1$ being amplified and integrated, whilst the signal applied to the transistor $T_2$ is blocked.

Referring to FIG. 2 it can be seen that the left-hand peak A of the waveform picked up by the pickup coil 7 occurs during the negative half cycle of the AC, whilst the peak B occurs during the positive half cycle of said AC. Hence the peak A is integrated by the diode pump integrator comprising diode $D_5$ and capacitor $C_5$, whilst the peak B is integrated by the diode pump integrator comprising diode $D_6$ and capacitor $C_6$. These integrated signals are applied via transistors $T_5$ and $T_6$, which provide current gain, to the meter 8. The meter 8 is arranged to be such that a zero reading is obtained when the peak A is equal in height to the peak B. Thus any deviation from the zero reading indicates asymmetry of the waveform picked up by the pickup coil 5, and hence a finite value of the magnetostriction coefficient of the cylindrical magnetic film. Moreover, the sense of the displacement from the zero reading indicates which of the peaks A and B is greater in height, and hence indicates the sign of the magnetostriction coefficient. It will be appreciated that when the gated differential amplifier of FIG. 4 is used in conjunction with the apparatus described with reference to FIG. 3, the meter 8 will give a zero reading normally, i.e., when no twist is being applied to the coated wire 5, and every 15 seconds may give a finite reading indicative of the magnetostriction coefficient of particular length of the cylindrical magnetic film under test.

Although the invention has been particularly described with reference to the embodiment thereof illustrated in FIGS. 3 and 4 of the accompanying drawings, other methods and apparatus may be employed for sensing displacement of the preferred direction of magnetisation of a thin magnetic film in response to the application thereto of a stress.

What I claim is:

1. Apparatus for testing the magnetostriction coefficient of a thin magnetic alloy film of cylindrical configuration applied to a conductive wire said film having a circumferential preferred direction of magnetisation, comprising pairs of spaced rollers between which the wire passes, means for applying an alternating current to the wire, a D.C. field coil surrounding and coaxial with the wire between two of said pairs of rollers, means for applying direct current to the D.C. field coil to produce a D.C. field at right angles to the circumferential alternating current field set up in the field by said alternating current, a pickup coil surrounding said wire in the vicinity where said D.C. field operates, means for displacing one of said pairs of rollers laterally to effect twisting of the wire supported between two other pairs of rollers and electrical differential measuring means coupled to the output of the pickup coil to afford an indication of any displacement of the preferred direction of magnetisation.

2. Apparatus as claimed in claim 1, in which the electrical differential measuring means comprises a transistorised gated differential amplifier.

3. Apparatus as claimed in claim 2, in which the gated differential amplifier is transistorised and includes a pair of diode pump integrator circuits for integrating respective peaks of the signal voltage output from the pickup coil indicative of the displacement of the preferred direction of magnetisation and in which the outputs from these pumps are applied to a meter which registers any difference between the integrated outputs and thus signifies displacement in the preferred direction and magnetisation.

References Cited

UNITED STATES PATENTS 3,076,933 2/1963 Negrete ............ 324—140
3,336,154 8/1967 Oberge ............ 324—34 X ALFRED E. SMITH, Primary Examiner U.S. Cl. X.R.

324—140